April 16, 1963   W. D. RIECKE   3,086,112
CORPUSCULAR RADIATION APPARATUS
Filed May 4, 1960   3 Sheets-Sheet 2

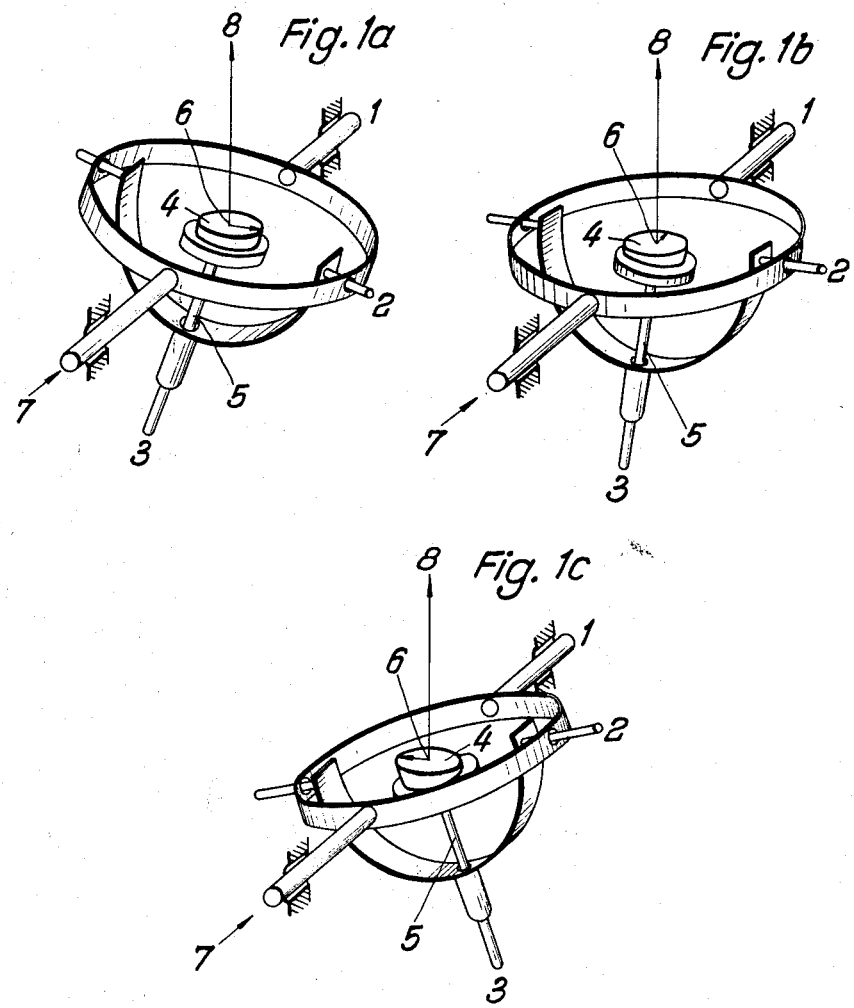

Inventor:
Wolfgang Dieter Riecke,
By [signature] Atty.

April 16, 1963 W. D. RIECKE 3,086,112
CORPUSCULAR RADIATION APPARATUS
Filed May 4, 1960 3 Sheets-Sheet 3

Inventor.
Wolfgang Dieter Riecke.
By [signature] Atty.

United States Patent Office 3,086,112
Patented Apr. 16, 1963

3,086,112
CORPUSCULAR RADIATION APPARATUS
Wolfgang Dieter Riecke, Berlin-Dahlem, Germany, assignor to Max-Planck-Gesellschaft Zur Foerderung der Wissenschaften E.V., Gottingen, Germany
Filed May 4, 1960, Ser. No. 26,801
Claims priority, application Germany July 24, 1959
14 Claims. (Cl. 250—49.5)

This invention relates to corpuscular radiation apparatus serving for the investigation of massive specimens or probes either by corpuscular-optical picturing or delineation of the surface or by diffraction of corpuscular rays at the surface thereof, and is particularly concerned with a specimen table for such apparatus, especially for electron microscopes and for electron diffraction devices, whereby the specimen is incident to rotation thereof guided by means of a Cardan arrangement operating with three axes.

It is in connection with apparatus of the above noted kind necessary to place the specimen which is to be investigated into a positive, well defined position and orientation relative to the corpuscular-optical system employed for the investigation. For example, in surface picturing or delineation, the area of the specimen surface which is to be investigated must be brought into the object plane and upon the lens axis of the objective lens of the lens system which effects the delineation. The specimen surface must moreover be inclined by a more or less large angle with respect to the lens axis depending upon the kind of investigation which is to be effected. It will also be frequently necessary to rotate the specimen without changing the position of its surface so as to provide between a preferred direction in the specimen surface and the lens axis of the objective a predetermined angle required for the investigation.

Similar requirements also appear in the investigation of a specimen or probe surface by corpuscular ray diffraction. For example, the corpuscular beam must usually fall upon the surface at almost grazing incidence and the angle between a preferred direction of the specimen and the incidence of the beam must be adjustable as required for the investigation. The specimen must again be adjusted linearly in such a manner that the area or place thereof which is to be investigated can be moved into the beam.

The realization of these requirements calls as in known for three translation coordinates and two rotation coordinates; the rotation of the specimen about the objective lens axis being unimportant for the corpuscular-optical delineation, and the rotation thereof about the incident electron beam being for the diffraction investigation likewise immaterial. In order to facilitate the course of investigation, the adjustment of the specimen or probe must be lucidly comprehensible and easily reproducible. These observations lead to further considerations relating to the selection of favorable rotation axes and adjustment devices:

First, the rotation axes are, for example, to be disposed so that they mutually intersect in the surface area to be investigated, thereby avoiding during the rotary motion displacement of such area away from observation and assuring continuous tracing of the effect of the adjustment in the delineation or with reference to the alteration of the diffraction diagram, respectively.

Second, the orientation of the specimen will become particularly lucidly comprehensible (a) in the case of delineation apparatus, by making the inclination of the specimen surface with respect to the objective lens axis and the angle between this axis and a preferred direction lying in the specimen plane, independently adjustable, and (b) in the case of diffraction apparatus, by the provision of means for independently selecting the angle of incidence of the beam and the angle between the beam and the preferred direction lying in the specimen surface.

Third, the specimen or probe is to be adjusted rectilinearly without changing its orientation, that is, without imparting thereto rotation incident to its rectilinear displacement.

The invention provides an adjusting table for effecting in precise manner the above indicated motions of the specimen. It is thereby important that all rotations are executed about axes which extend very accurately through the point or area of the specimen surface under investigation. The invention distinguishes in this respect above all other previously known arrangements. It must be considered in this connection that, since the diameter of the delineated area and the size of the irradiated and therefore investigated surface part amounts in the case of delineation apparatus as well as in the case of diffraction devices only to a few hundredths of a millimeter, the axes of rotation must intersect accurately within about one hundredth of a millimeter. This accuracy, which is not contemplated in known devices, requires particular structural features which are part of the invention.

The foregoing and other objects and features of the invention will be brought out in the course of the description which will be rendered below with reference to the accompanying drawings.

In the drawings,

FIGS. 1a, 1b, 1c illustrate in schematic manner the disposition of a specimen in a three-axes Cardan device;

Figure 4:
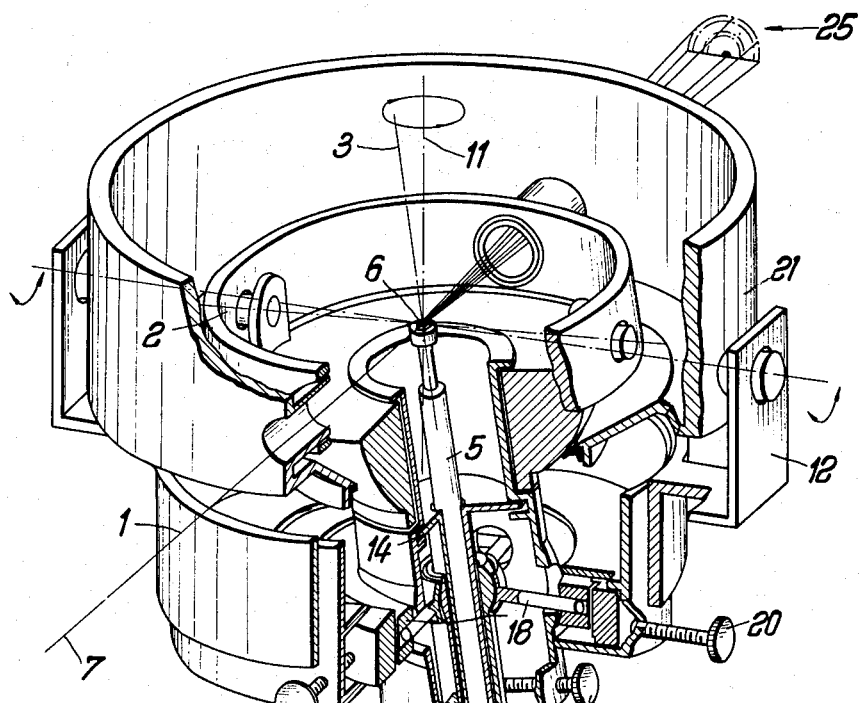
FIG. 4 represents an embodiment of a specimen table for a diffraction apparatus.

The object according to which all rotation axes are to extend accurately through one point is in accordance with the invention achieved by suspending the specimen in a three-axes Cardan device which is schematically illustrated in FIGS. 1a to 1c. The three Cardan axes 1, 2 and 3 (the axis 1 being fixed in the apparatus) can be brought very accurately to intersect by adjusting at least two of the axis journals by transverse shifting by means of adjusting screws. The surface of the specimen 4 is by adjustment of the tube 5 moved in the direction of the Cardan axis into the axes intersection point 6. In case the specimen table is used in a diffraction apparatus, the corpuscular beam 7 must be directed to the point 6, by means of magnetic or electric deflection systems or by lateral displacement of the corpuscular source, so that the surface area under investigation is disposed in the rotation axes intersection point. In the case of corpuscular-optical delineation, the rotation axes intersection point must lie in the object plane and upon the lens axis of the objective lens. This may be achieved, for example, by suitably adjusting the objective lens by means of setting screws. However, all three Cardan axes may be made adjustable by means of setting screws for effecting adjustment thereof with respect to the object point lying on the objective axis. It is understood, of course, that the Cardan axes need not necessarily lie perpendicularly one with respect to the other, as represented in FIGS. 1a, 1b, 1c; angles other than 90° angles may in some cases be more favorable from the constructional point of view.

The guiding of the rotary motions by means of the described Cardan arrangement is particularly favorable because only three axes must be brought to intersection while the specimen can be rotated about any desired axis even if such axis does not coincide with the Cardan axes, such axis however also passing through the Cardan center point 6. In FIGS. 1a, 1b, 1c, this is represented for the rotation about a rotation axis 8 which does not coincide with a Cardan axis.

Figure 2:
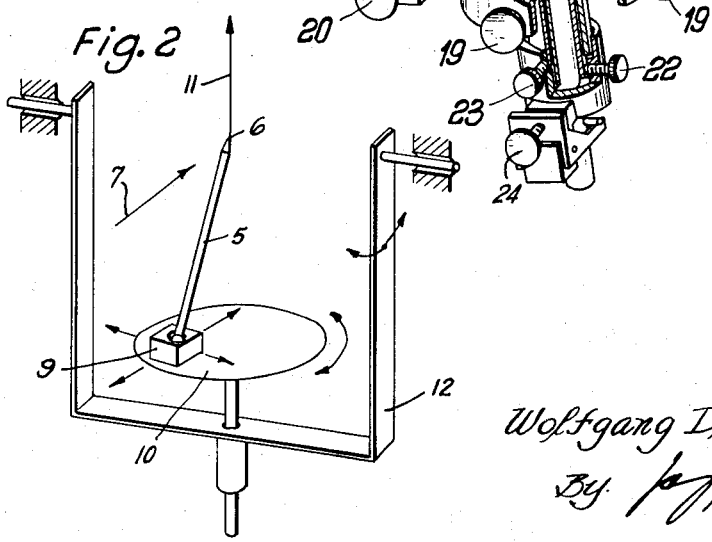
FIG. 2 shows an embodiment of an adjusting device for effecting the rotary motions.

These rotary motions are advantageously executed by means of a particular adjusting device which may be constructed in the manner shown in FIG. 2. The axes intersection point of the Cardan device (not shown in this figure) is again indicated by numeral 6 and the rod carrying the specimen or probe is indicated by numeral 5. The specimen surface can be adjusted perpendicularly to the rotation axis 11 by moving the guide member 9 in the plane of the cross table 10. Upon rotating the specimen about the axis 11, the cross table with the rod 5 will be rotated about this axis. The rotation axis 11 can also be tipped relative to the corpuscular beam 7 or in the case of delineation apparatus relative to the objective axis, by angular displacement of the bracket 12. A particular advantage of this adjusting device resides in the fact that a specimen surface, adjusted by means of the cross table 10 perpendicular to the rotation axis 11, remains perpendicular to the axis 11 even upon rotation about such axis and upon tipping of the axis 11. The orientation of the specimen is thereby rendered particularly lucid and comprehensible.

The directions of the translatory adjustments are advantageously such that two of the adjusting devices are perpendicular to one another and also relative to the rotation axis 11; the surface once adjusted perpendicular to this axis and extending through the Cardan central point 6 will then also pass through the point 6 even after the transverse adjustment. The guide member 9 shown in FIG. 2 is therefore, in accordance with the invention, constructed in the manner shown in FIGS. 3a and 3b.

Figure 3A:
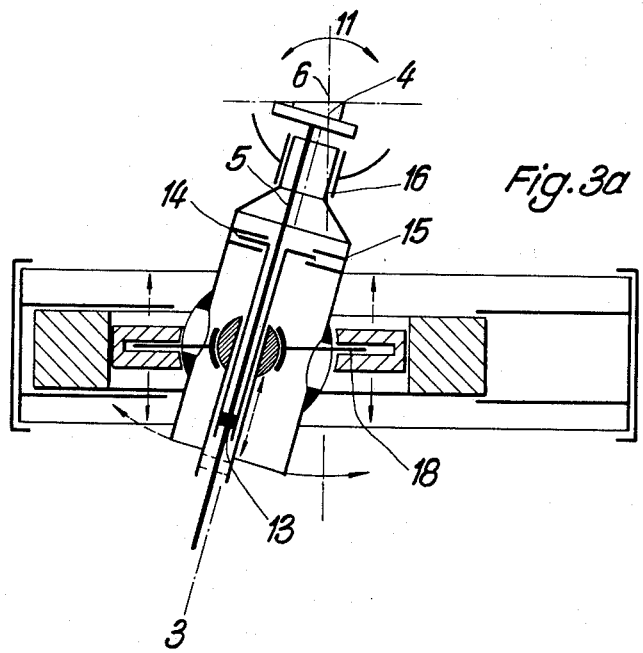
FIGS. 3a and 3b show the construction of a guide member indicated in FIG. 2.
Figure 3B:
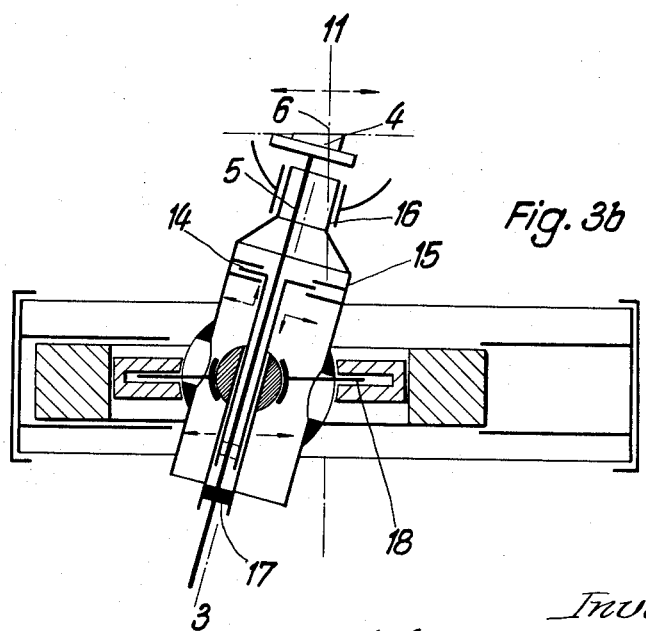

Referring now to FIGS. 3a and 3b, since the Cardan axis 3 usually does not coincide with the rotation axis 11, the rod 5 must be adapted to execute incident to the transverse adjustment, a motion in the direction of the Cardan axis 3. However, incident to the rotary motion, the rod 5 must not move in the direction of the Cardan axis 3 so that the specimen area or spot which is being investigated is held in the Cardan center point 6. The rod 5 is therefore incident to rotary motion by means of the clamping device 13 coupled to a guide 14 which is connected with the shaft 16 of the Cardan axis by way of the tube 15. The guide 14 prevents motion of the rod 5 in the direction of the Cardan axis 3 (FIG. 3a). For executing the transverse motion, the clamping member 13 is released and the rod 5 is by means of the clamping member 17 coupled to the guide 18 which permits motions only perpendicular to the rotation axis 11 (FIG. 3b.)

FIG. 4 shows an example of an embodiment of a specimen table for a diffraction apparatus. Parts corresponding to those discussed in connection with FIGS. 1a to 3b are indicated by reference numerals conforming to those applied in the previously described figures. Numeral 19 indicates gear means for the transverse adjustment; 20 indicates gear means for adjusting the specimen surface perpendicular to the rotation axis 11; 21 indicates the housing of the diffraction apparatus; 22 indicates the coupling to the Cardan guide; 23 the coupling for the adjustment perpendicular to the rotation axis 11; 24 the drive means for adjusting the specimen in the direction of the Cardan axis 3; and numeral 25 indicates the diffraction diagram.

Changes may be made within the scope and spirit of the appended claims which define what is believed to be new and desired to have protected by Letters Patent.

I claim:

1. In a corpuscular radiation apparatus, the combination of a specimen carrier, a Cardan arrangement for operatively disposing said carrier for movement about any of three mutually accurately intersecting axes, and means operatively connecting said carrier to said Cardan arrangement for movement of such carrier along an axis intersecting said Cardan intersection point for effecting adjustment of said carrier toward and away from such intersection point.

2. Apparatus according to claim 1, wherein said axes of said Cardan arrangement extend mutually perpendicularly.

3. Apparatus according to claim 1, wherein one of said Cardan axes is fixedly disposed, journal means for two of said Cardan axes, and means for controlling said journal means to effect intersection of said two axes with said fixedly disposed axis.

4. Apparatus according to claim 1, comprising journal means for said three Cardan axes, and means for moving the respective journal means so as to cause all axes to pass through a fixed point.

5. Apparatus according to claim 1, in combination with a corpuscular-optical system for delineating the surface of a specimen disposed on said carrier, wherein the intersection point of said Cardan axes lies in the object plane and upon the objective axis of the delineating system.

6. Apparatus according to claim 4, in combination with a corpuscular-optical system for delineating the surface of a specimen disposed on said carrier, wherein the intersection point of said Cardan axes lies in the object plane and upon the objective axis of the delineating system.

7. Apparatus according to claim 1, in combination with a corpuscular radiation source for diffraction investigations, comprising deflection systems operatively effective between the corpuscular radiation source and the Cardan center point for directing the corpuscular beam upon the Cardan axes intersecting point.

8. Apparatus according to claim 3, in combination with a corpuscular radiation source for diffraction investigations, comprising deflection systems operatively effective between the corpuscular radiation source and the Cardan center point for directing the corpuscular beam upon the Cardan axes intersecting point.

9. Apparatus according to claim 1, in combination with a corpuscular radiation tube for diffraction investigations, wherein the corpuscular beam is aimed to the Cardan center point by lateral displacement of the corpuscular radiation tube.

10. Apparatus according to claim 1, comprising means for fixedly disposing one of said Cardan axes, journal means for two of said Cardan axes, means for controlling said journal means to effect intersection of said two axes with said fixedly disposed axis, a corpuscular radiation tube for diffraction investigations, and means for laterally displacing said tube to aim the corpuscular beam to the Cardan center point.

11. Apparatus according to claim 1, wherein said connecting means includes a releasable guide member, and means for coupling the specimen carrier with said guide member, said guide member being adapted to effect transverse adjustment only perpendicularly to a rotation axis which does not necessarily coincide with a Cardan axis.

12. Apparatus according to claim 1, wherein said connecting means includes adjusting means extending in the direction of a Cardan axis for moving a specimen disposed on said carrier into the Cardan axis intersection point.

13. Apparatus according to claim 1, comprising a cross table, and a guide member cooperating with said cross table for tipping one of said Cardan axes relative to a predetermined rotation axis.

14. Apparatus according to claim 13, wherein a specimen disposed on said carrier, together with said cross table, can be rotated about an axis which does not coincide with a Cardan axis, the angle between the rotation axis and one of the Cardan axes thereby remaining constant.

References Cited in the file of this patent

UNITED STATES PATENTS

| | | |
|---|---|---|
| 2,418,903 | Runge | Apr. 15, 1947 |
| 2,499,019 | Dornfeld | Feb. 28, 1950 |
| 2,715,007 | Zeitlin | Aug. 9, 1955 |
| 2,762,123 | Schultz et al. | Sept. 11, 1956 |
| 2,951,157 | Haine et al. | Aug. 30, 1960 |